United States Patent [19]

Tracy

[11] 4,244,769

[45] Jan. 13, 1981

[54] METHOD OF CONSTRUCTING LARGE POSTERS FOR BACK-LIGHTED SIGNBOARDS

[76] Inventor: Charles H. Tracy, 16515 Kingswood Dr., Lakeville, Minn. 55044

[21] Appl. No.: 99,071

[22] Filed: Nov. 30, 1979

[51] Int. Cl.³ ............................................. G09F 15/00
[52] U.S. Cl. ..................................... 156/300; 40/560; 40/611; 40/624; 156/304; 428/46; 428/47; 428/50; 428/58; 428/61
[58] Field of Search .................. 156/300, 304; 428/46, 428/47, 50, 58, 61; 40/560, 611, 624, 219, 559, 563, 605

[56] References Cited

U.S. PATENT DOCUMENTS 4,092,450   5/1978   Haren ..................................... 428/62

Primary Examiner—Marion McCamish

[57] ABSTRACT

Method of constructing a large poster for a back-lighted signboard from a plurality of smaller poster sections including improving the translucent quality of the poster material, aligning respective adjacent sections for exact image continuity, laminating a clear film over a first poster layer, laminating a second poster layer over the clear film, and applying heat and pressure to create a composite laminated poster having registered images throughout.

5 Claims, 8 Drawing Figures

METHOD OF CONSTRUCTING LARGE POSTERS FOR BACK-LIGHTED SIGNBOARDS

BACKGROUND OF THE INVENTION

This invention relates to a method for constructing large signboard posters, and specifically to a method for constructing posters adaptable for use in large signboards where back-lighting is used to create an illuminated poster image and thereby provide an enhanced visual effect.

In the field of outdoor advertising as it relates to large billboards the typical and preferred method of applying a very large poster to a billboard is to apply it in sections or sheets. Each section is typically glued or pasted to the billboard surface by a worker skilled in this field using long handled brushes and other tools for this purpose. The edges of adjacent sections are reasonably carefully aligned while the adhesive material is still in an unset condition so that adjacent sections may be moved about over the billboard. The number of sheets applied in this manner varies with the relative size of the billboard, but it is not unusual to apply a dozen or more sections to a billboard in the size range of ten feet by twenty-four feet or larger. Billboard posters applied in this manner are typically made from poster paper which has very little structural strength itself, but which when adhered to a billboard surface will withstand normal weathering and exposure to the elements for a number of months.

Billboards and posters constructed according to the aforementioned procedure may be illuminated for nighttime display, but such illumination usually takes the form of directional lighting illuminating the front surface of the billboard from a position above or below the billboard surface so as to create a minimum line of sight interference with the poster itself. Such lighting enhances the advertising value of the billboard by increasing the number of hours per day that the billboard serves as an advertising medium.

It has been known that a number of advantages can be had by lighting a billboard from the rear surface, one of which is the obvious advantage of being able to house the electrical circuits and lighting fixtures within the billboard structure itself to avoid exposure to the elements and to minimize damage from weather and vandalism. Further, a back-lighted billboard presents a more pleasing image which is somewhat softer to view and is more likely to draw attention to the poster displayed on the billboard. Prior art poster images which have utilized back-lighted signboards have most often been constructed using photographic techniques on film, usually utilizing only a single sheet of material for this purpose. Since it has not been possible to create very large single sheet photographic images such back-lighted billboards have typically been rather small in size and in no way approaching the size of a standard outdoor billboard. When larger billboards have been attempted to be constructed using a plurality of photographic images in edge alignment to create a large poster image, the problem of providing imperfect edge alignment has resulted in very visible lines of light escaping between adjacent photographic sections. These edge lines result from the back-lighting shining directly through the billboard surface, and they tend to be very distractive of the overall image and produce a resultant lower quality and less pleasing poster effect.

SUMMARY OF THE INVENTION

The present invention provides a method for constructing large billboard posters from laminated sections which are bonded together to form a structurally strong yet translucent poster surface. The posters constructed according to this process are suitable for clamping or hanging over a translucent billboard surface without the necessity for adhering the poster directly to the billboard surface, whereby they may be conveniently removed and replaced or removed and transferred to a different billboard location without damage to the poster.

It is therefore a principal object of the invention to provide a process for manufacturing a billboard poster from a plurality of individual poster sheets, each sheet having thereon a portion of the overall billboard image, to form a large poster having sufficient structural strength to be hung, stretched, or otherwise clamped to a back-lighted billboard.

It is a further object of this invention to provide a process for manufacturing a large billboard poster having carefully edge-aligned sections and multiple laminated layers which are translucent.

It is yet another object of the present invention to provide a process for manufacturing large billboard posters wherein multiple poster images are laminated together in precise image registration.

It is yet another object of the present invention to provide a process for manufacturing posters wherein the poster has sufficient strength for self-supporting mounting.

Other objects and advantages will become apparent from a reading of the attached specification and drawings.

BRIEF DESCRIPTION OF THE DRAWINGS

A preferred embodiment and method is disclosed herein and with reference to the appended drawings, in which.

DESCRIPTION OF THE PREFERRED EMBODIMENT

Figure 1:
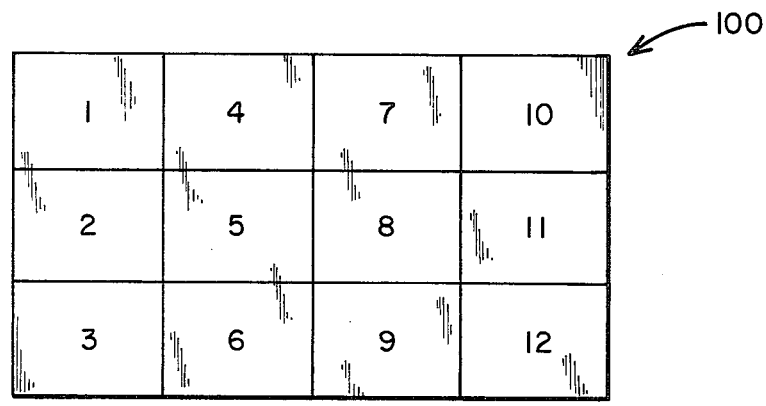
FIG. 1 shows the construction of a large billboard poster from sections.

Referring first to FIG. 1 there is shown a large billboard poster 100 constructed from the alignment of a plurality of sections 1–12. It is presumed that each of the sections 1–12 contains a portion of the overall image, which image is formed when all of the sections are properly aligned as shown. In a poster used for a typical outdoor advertising billboard the size of poster 100 may be in the range of 6–12 feet high by 12–30 feet wide, each of the sections 1–12 being proportionately sized to form the necessary overall poster. Such billboard posters are typically constructed from a paper material of 60–90 pound weight by a printing process, wherein each of the individual sections are separately printed, and with a printing process allowing for some image overlap on adjacent edges which is preferably trimmed at the time the poster is assembled. Commonly available poster paper is not inherently translucent, but is made translucent through some of the inventive steps described herein.

The preferred embodiment of the present method requires two overall poster images, and thereby it is necessary that each of sections 1-12 be printed in duplicate according to the teachings of the invention. This is easily accomplished in practice, for printers who print such posters typically print dozens, and even hundreds, of poster sections at a time for distribution throughout a given advertising region. The present invention utilizes such printed poster sections in the form normally produced and without any change required to accepted printing practices.

Figure 2A:
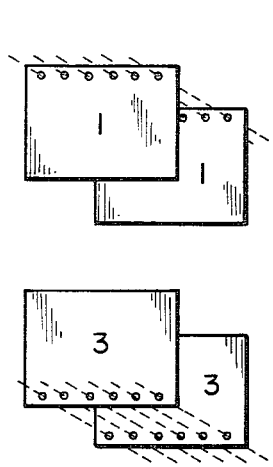
FIGS. 2A and 2B show the alignment steps for multiple images.
Figure 2B:
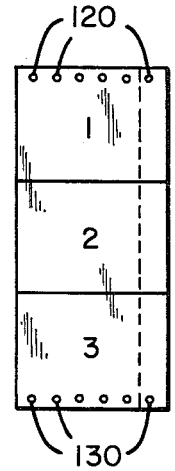

FIG. 2A illustrates a first step in the process wherein identical poster image sections are registered, one atop the other, preferably on a light table whereby the images may be precisely overlayed and aligned. A plurality of locating holes is punched through both images after such alignment in order that the identical images may be separated and subsequently repositioned on pins through the locating holes to recover the precise alignment thus established. FIG. 2B shows poster sections 1, 2 and 3 aligned together, where it is presumed that the edge alignment between section 1 and section 2 is accomplished by means of careful alignment of respective image parts and, similarly, edge alignment between sections 2 and 3 is accomplished through careful image alignment. Thus, the image itself permits vertical alignment of sections 1, 2 and 3 of a plurality of poster sections, and the locating pins 120 and 130 permit overlay registration of a second plurality of identical poster sections.

The general procedure described above is followed for each of the poster sections 4, 5, 6 and 7, 8, 9 and 10, 11, 12, or for as many poster sections as any particular poster may utilize. As each of the sections, 1, 2, 3 or 4, 5, 6, etc. is aligned according to the procedures described above there is some overlap between adjacent sheets wherein, for example, a portion of the image along the top edge of sheet 2 also appears along the bottom edge of sheet 1. This overlap is removed by using a sharp edge to cut through the overlapped sheets and thereby provide a precise edge alignment and a continuous image flowing between sheet 1 and 2. Similarly, the overlap image may be removed from all other sheets wherein this occurs.

After each section of three vertically aligned sheets have been trimmed according to the above procedure the sheets are treated by immersion in a chemical solution to make the sheets translucent. The chemical solution preferably used for this purpose contains about 13% liquid silicone at 50-100 ANGS viscosity and about 87% mineral spirits of the type that meet the Form 66 Federal Standards for emission and evaporation. A liquid silicone which works well for the intended purpose is manufactured by General Electric Company as type SF 96-100. The sheets are immersed in the foregoing solution for a period of 8-16 hours and are then removed for drying. Drying may be accomplished in air in about 24 hours, or in an oven at approximately 175° for 3-4 hours. This latter method preshrinks the sheets by a predetermined amount, which preshrinking has been found advantageous in practice.

Figure 3:
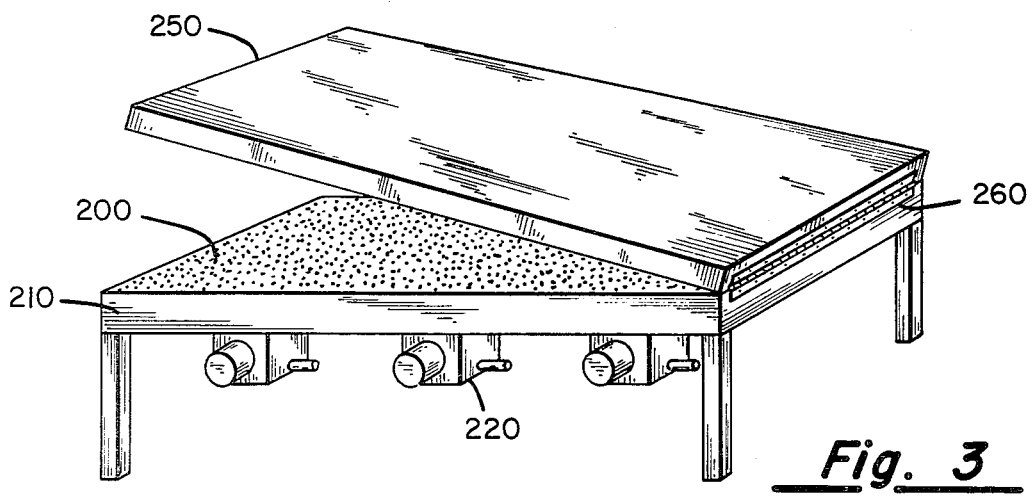
FIG. 3 shows the laminating apparatus.

After the sheets have been treated according to the foregoing description they are ready for laminating according to the following preferred process. FIG. 3 shows a laminating table suitable for use in this process, wherein a large size bed 200 has a plurality of spaced holes therethrough and over the entire bed surface, and wherein the holes are in communication with a vacuum chamber 210 beneath bed 200. Vacuum pumps 220 create a suction force through the holes to secure any sheet which is laid atop bed 200 tightly to the bed. The size of bed 200 is preferably about 7 feet by 13 feet, which is sufficient to accommodate a section of three poster sheets of approximately the same size. A table top 250 is hinged at one end 260 so that it may be raised above bed 200. Table top 250 has a plurality of heating devices arranged along its lower surface so as to provide a uniform heating which radiates downwardly. For example, one construction for this device utilized seventy-two 250 watt infrared heat lamps uniformly spaced over the undersurface of top 250. These heat lamps produce a temperature of about 200° F. over the surface of bed 200. Temperature sensors and control circuitry may be mounted on the apparatus to control the bed temperature to a desired setting. Three of the treated sheets, for example sheets 1, 2, 3, are laid on bed 200 and positioned in precise image alignment. Vacuum pumps 220 are activated to create a suction through the plurality of holes over bed 200 and to thereby securely hold the sheets to the bed. Registration pins are placed through the holes previously made along the edges of sheets 1 and 3 for purposes to be hereinafter described.

Either of two lamination processes may be used hereafter. The first process utilizes a clear polyester film of thickness 0.002-0.003 inches, which film has a thermosetting adhesive coated on its top and bottom surface. The film is overlaid atop the sheets which are positioned on bed 200, leaving about a 6-inch edge uncovered along the edge of the sheets which are to be subsequently mated with sheets from an adjacent section. Next, the matching three sheets are placed over the registration pins and on top of the thermosetting laminate and they are precisely aligned for good image quality. A silicone rubber blanket, approximately 1/16th inch thick, is rolled over the entire assembly and top 250 is lowered to cover the silcone rubber blanket. The heat lamps in top 250 are turned on and the temperature controls are set to maintain the temperature at just above the thermosetting adhesive melting point. In a typical process the melting point is approximately 200° F., and the vacuum pumps are selected so as to provide about 25 pounds per square inch (psi) of pressure across the sheets, and the temperature is applied for about fifteen minutes.

This process is repeated for each of the three sheet sections, in each case leaving about a 6-inch edge uncovered along sheets which are to be mated to adjacent sections. After this portion of the process is completed there is produced a plurality of laminated sections of poster having non-laminated adjacent edges as illustrated in FIG. 4.

Figure 4:
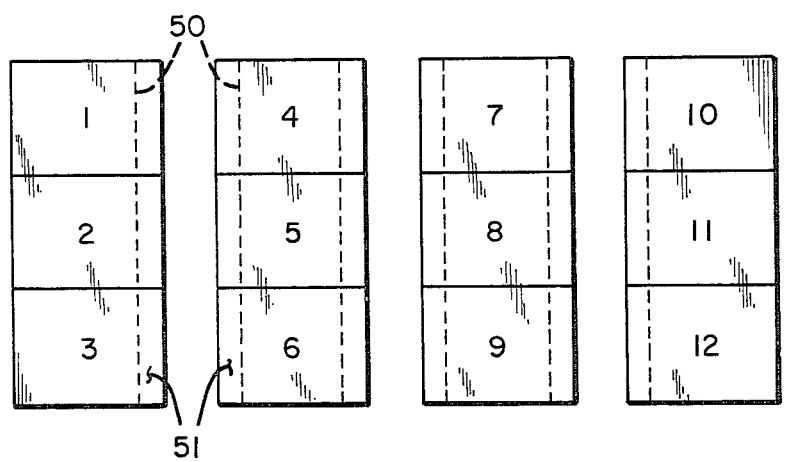
FIG. 4 shows an intermediate step in the construction of a large poster.
Figure 5A:
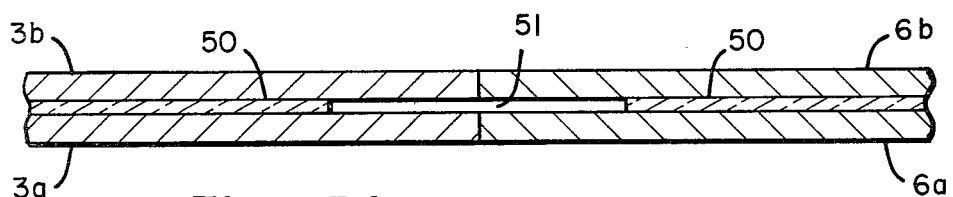
FIGS. 5A–5C show steps in the bonding of adjacent poster sections.
Figure 5B:
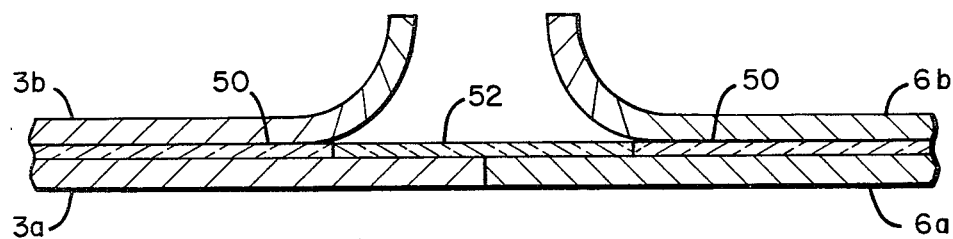
Figure 5C:
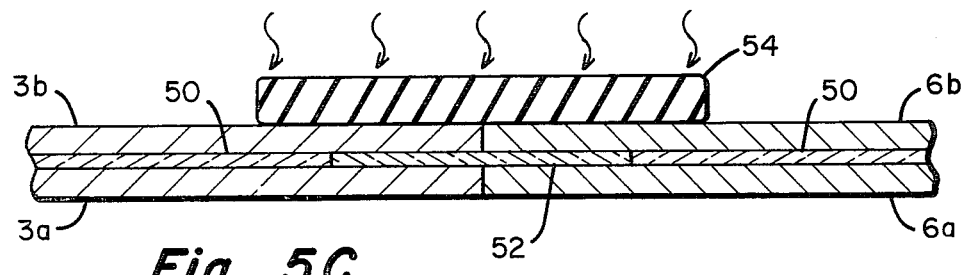

FIGS. 5A, 5B and 5C show a side view of a portion of the poster of FIG. 4. Specifically, FIG. 5A shows a side view of a portion of sheets 3 and 6, wherein the bottom poster layer of sheet 3 is shown as 3A and the top poster layer of sheet 3 is shown as 3B. Similarly, the bottom and top portions of sheet 6 are illustrated as 6A and 6B. A polyester film layer 50 lies between the respective poster sheets, and an intermediate void 51 extends along the respective sheet edges. FIG. 5B shows the process for placing a strip of polyester film in void 51, wherein a strip of clear polyester film 52 having thermosetting adhesive coated on top and bottom surfaces is placed in bridging relationship to sheets 3A and 6A, sheets 3B and 6B being raised to permit film 52 to be placed. FIG. 5C illustrates the final step in the process of bonding adjacent sections together, wherein a silicone rubber blanket 54 is laid over the adjacent sheet edges and pressure and heat are applied as described hereinbefore.

The aforementioned steps may be accomplished in the continuous process if a large table is used in addition to a laminator of the type described herein. In this instance, the intermediate laminating layer containing the thermosetting adhesive is applied first to the sheets comprising an end section of the poster, and these sheets are then moved partially through the laminator and the next adjacent sheets are positioned and aligned for image continuity, and the heating process is repeated for an intermediate polyester film layer bridging the two poster sections. The portion of poster thus laminated is again partially moved through the laminator and the next adjacent poster sheets are aligned and the process steps are continually repeated until the entire poster is formed.

An alternative laminating process may be used with clear polyester film having pressure sensitive adhesive coated on both sides of its surfaces. The adhesive typically has a 90-pound silicone treated paper liner overlaying the surfaces to protect the adhesive. Using this alternative process the bottom poster sheets are aligned as described before and one side of the pressure sensitive adhesive is exposed by removing the silicone treated paper from that side, and this surface is adhered to the aligned bottom poster sheets by application of pressure. Next, a narrow strip of the silicone treated liner is removed from the top surface of the film to expose a portion of the underlying poster image. The top sheet of the poster image is then positioned in good image registration using the exposed underlying sheet for this purpose and the top sheet is adhered to the laminate by pressure application along the exposed strip. After the top sheet has been adhered in this manner the remaining silicone treated liner is removed and the remaining portion of the top sheet is similarly adhered to the laminate.

After an entire poster has been formed in this manner the edges are trimmed to size and the poster may be hung or stretched over a back-lighted signboard. I have found it preferable to attach a metallic strip along top and bottom poster edges by any convenient attaching means, and to utilize this metallic strip as the means for attachment to the billboard. The entire poster may be conveniently rolled for transportation to a billboard, and may be readily hung on the billboard by merely attaching ropes or cables to the top metallic strip and raising the poster across the billboard surface. Once it is properly positioned attachments may be made to the bottom metallic strip and by application of tension the poster may be stretched over the billboard surface for display. Replacement of a poster attached in this way merely involves the steps of relieving the tension holding the poster to the billboard, lowering the top portion of the poster, lowering the poster from the billboard while again rolling it into a convenient size for transport, and disconnecting the attachments to the metallic strips so that it may be removed from the billboard. A poster may thus be hung on a billboard, removed and if desired transported to a second billboard for reuse.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of constructing a large poster from a plurality of sheets containing image portions, for use on a back-lighted signboard, comprising the steps of
    (a) immersing the plurality of poster sheets in a solution of about 13% liquid silicone and about 87% mineral spirits, and removing the sheets from solution and drying them;
    (b) aligning a first group of adjacent image sheets in abutting image edge alignment;
    (c) overlaying the edge-aligned sheets with a clear film layer having adhesive surfaces
    (d) overlaying the clear film layer with a second group of matching image sheets and aligning said sheets in image registration with said first group of sheets; and
    (e) forming a laminated whole from said first group, said clear film layer, and said second group.

2. The method of claim 1, wherein the step of immersing is done for at least about 8 hours.

3. The method of claim 2, wherein the step of drying said sheets further comprises heating said sheets to a temperature of about 175° F. for at least 3 hours.

4. The method of claim 1, wherein the step of forming a laminated whole further comprises heating and compressing said first group, said clear film layer, and said second group.

5. The method of claim 1, wherein the step of overlaying the edge aligned sheets with a clear film layer having adhesive surfaces comprises overlaying all except a narrow edge of said sheets, said sheets becoming a first plurality of sheets, and further comprising repeating steps a, b, and c for a second plurality of sheets, and placing said second plurality in edge abutting image alignment with said first plurality of sheets, and overlaying the respective narrow edges of said sheets not previously overlaid with a clear film layer having adhesive surfaces bridging said edge abutting sheets and intermediate said first and second group of matching image sheets, and forming a laminated whole from said first group, said clear film layer and said second group along said narrow edge.

* * * * *